United States Patent [19]

Suzuki et al.

[11] Patent Number: 4,786,680
[45] Date of Patent: Nov. 22, 1988

[54] RUBBER COMPOSITION FOR TIRE TREAD

[75] Inventors: Yukizi Suzuki, Hiratsuka; Yasushi Kikuchi, Odawara, both of Japan

[73] Assignee: The Yokohama Rubber Co., Ltd., Tokyo, Japan

[21] Appl. No.: 105,744

[22] Filed: Oct. 8, 1987

[30] Foreign Application Priority Data

Oct. 14, 1986 [JP] Japan ................................. 61-242152

[51] Int. Cl.$^4$ ........................... C08L 7/00; C08L 9/00; C08L 9/06; C08K 9/20
[52] U.S. Cl. .................................... 524/495; 524/496; 525/194; 525/213; 525/214; 525/237
[58] Field of Search ................ 524/495, 496; 525/194, 525/213, 214, 237

[56] References Cited

U.S. PATENT DOCUMENTS

| | | | |
|---|---|---|---|
| 4,323,485 | 4/1982 | Ahagon et al. | 525/237 |
| 4,550,135 | 10/1985 | Iwama et al. | 524/495 |
| 4,555,548 | 11/1985 | Ueda et al. | 525/237 |
| 4,678,830 | 7/1987 | Sato et al. | 524/495 |

Primary Examiner—Allan M. Lieberman
Attorney, Agent, or Firm—Armstrong, Nikaido, Marmelstein & Kubovcik

[57] ABSTRACT

A rubber composition for a tire tread, comprising natural rubber and/or polyisoprene rubber, a specific styrene-butadiene copolymer rubber, and halogenated butyl rubber.

5 Claims, No Drawings

RUBBER COMPOSITION FOR TIRE TREAD

BACKGROUND OF THE INVENTION

The present invention relates to a rubber composition for tire tread, which causes less heat build-up in the tire tread portion during running, enables reduced fuel consumption, remarkably improves braking power not only on a wet road surface but also on a snow-covered or frozen road surface, and which is especially excellent in driving property on a wet road surface.

In order to meet the recent social needs for material resource saving and energy saving, there has arisen a demand for reduced fuel consumption by automobiles. Thus, not only the development of car bodies themselves including engines which consume only a smaller amount of fuel has been made, but also studies of reduced fuel consumption tires which enable decreased energy loss have been increasingly made.

A rubber material having a smaller hysteresis loss has heretofore been sought as a raw material for a reduced fuel consumption tire. For example, the tread portion is said to be responsible for 50% or more of the hysteresis loss. Thus, natural rubber, polyisoprene rubber, polybutadiene rubber, styrenebutadiene copolymer rubber of a low glass transition temperature (Tg), and blends thereof, all of which have a small hysteresis loss, have been used as the rubber component of the tread portion. In an aspect of the rubber composition, there have heretofore been used rubber compositions containing a relatively small amount of carbon black having a relatively large particle size and as small an amount of a softener, such as an aromatic oil, as possible.

Recently, higher performance levels under adverse conditions have been sought for in a tire. For example, in the reduced fuel consumption tire developed as described above, a high braking performance capable of adapting the tire to a wet road surface and a snowcovered or frozen road surface from the viewpoint of safety without detriment to the reduced fuel consumption have been seriously demanded.

Where use is made of natural rubber, polyisoprene rubber, polybutadiene rubber, or low-Tg styrenebutadiene copolymer rubber, all having a small hysteresis loss as described above, the tire obtained has a defect in that the braking power, particularly on a wet road surface (wet skid resistance) is poor, leading to an extremely poor running stability. Where carbon black having a large particle size is used, deterioration of properties such as braking power on a wet road surface and abrasion resistance cannot be avoided although the fuel consumption can be remarkably reduced. Further, since the rubber composition used in the tread portion of a reduced fuel consumption tire contains a smaller amount of a softener blended therein, it is liable to harden at low temperature, with the result that the braking power on a snow-covered or frozen road surface (ice skid resistance) is not fully satisfactory.

On the other hand, high-vinyl polybutadiene and high-vinyl styrene-butadiene copolymer rubbers containing 50% or more of 1,2-vinyl bonds have recently been proposed as a material satisfying both reduced fuel consumption and enhanced wet skid resistance. However, since these rubbers have a high glass transition temperature (Tg), they are poor in abrasion resistance and are apt to harden at low temperatures, leading to notably poor braking power on a snow-covered or frozen road surface. Thus, they are also insufficient in satisfying all the above-mentioned properties.

As discussed above, there have been no proposals for tires which satisfy all the desired properties such as reduced fuel consumption, and enhanced braking power on wet roads and on a snow-covered or frozen road surface. Particularly in winter when the road surface becomes slippery as a result of snowfall or freezing, ordinary tires, including reduced fuel consumption tires, exhibit a very low braking power on the road surface as mentioned above. Thus, the use of a snow tire is often required. This forces a user to spend considerable time and labor in exchanging tires. In view of this, appearance of an all-season tire, which is essentially an ordinary summer season tire but which can satisfy the above-mentioned three desired properties, has been eagerly sought.

SUMMARY OF THE INVENTION

The present invention has been made with a view to meeting such a demand. Thus, an object of the present invention is to provide a rubber composition for tire tread which causes less heat build-up in the tire tread portion during running, enables reduced fuel consumption, remarkably improves braking power not only on a wet road surface but also on a snow-covered or frozen road surface, and which is particularly excellent in driving property on a wet road surface. This composition is useful for the tread portion of a pneumatic all-season tire capable of being used throughout the whole year irrespective of summer or winter.

In accordance with the present invention, there is provided a rubber composition for a tire tread, which comprises (a) 25 to 55 parts by weight of natural rubber and/or polyisoprene rubber, (b) 5 to 15 parts by weight of halogenated butyl rubber, and (c) 70 to 30 parts by weight of a styrene-butadiene copolymer rubber including 0 to 30 wt. % of bonded styrene units and 25 to 80% of 1,2-vinyl bonds in the butadiene units and having at a molecular terminal or in a chain thereof an atomic group introduced thereinto and represented by the following formula:

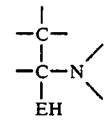

wherein E is O or S.

The foregoing object and other objects, and features of the present invention will become apparent from the following description.

THE PREFERRED EMBODIMENT

In the present invention, the rubber composition includes 25 to 55 parts by weight of natural rubber and/or polyisoprene rubber, 70 to 30 parts by weight of a specific styrene-butadiene copolymer rubber, and 5 to 15 parts by weight of halogenated butyl rubber. This is because any formulation outside the range as specified above disadvantageously deteriorates any one of reduced fuel consumption, enhanced braking power on a wet road surface, and enhanced braking power on a snow-covered or frozen road surface. However, 30 parts by weight or less of other diene rubber such as polybutadiene, acrylonitrile-butadiene copolymer, or non-modified styrene-butadiene copolymer rubber may be further incorporated in the rubber composition, with the proviso that total rubber contents are in an amount of 100 parts by weight.

(1) In the styrene-butadiene copolymer rubber to be used herein, an atomic group represented by the following formula (I) is introduced into a molecular terminal or chain:

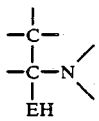

wherein E is O or S.

Introduction of the atomic group represented by the above-mentioned formula (I) is effected by reacting a compound (hereinafter referred to as the "compound A") having a bonding unit represented by the following formula:

(wherein E stands for an O atom or an S atom), with tyrene-butadiene copolymer.

Examples of the compound A include N,N-dimethylformamide and N,N-diethylformamide; N,N-diethylacetamide; aminoacetamide, N,N-dimethyl-N',N'-dimethylaminoacetamide, and N-phenyldiacetamide; N,N-dimethylacrylamide and N,N-dimethylmethacrylamide; propionamide and N,N-dimethylpropionamide; 4-pyridylamide and N,N-dimethyl-4-pyridylamide; N,N-dimethylbenzamide, p-aminobenzamide, N',N'-(p-dimethylamino)benzamide, and N',N'-dimethyl-N'-(p-ethylamino)benzamide; N-acetyl-N-2-naphthylbenzamide; nicotinamide and N,N-diethyl-nicotinamide; succinamide, maleamide, and N,N,N',N'-tetramethylmaleamide; succinimide, maleimide, N-methylmaleimide, N-methylphthalimide, 1,2-cyclohexane-carboximide, and N-methyl-1,2-cyclohexanedicarboximide; oxamide, 2-furamide, N,N-N',N'-tetramethyloxamide, and N,N-dimethyl-2-furamide; N,N-dimethyl-8-quinolinecarboxamide; N,N-dimethyl-p-aminobenzalacetamide and N,N-dimethyl-N',N'-(p'-dimethylamino)cinnamylideneacetamide; N,N-dimethyl-N',N'-(2-dimethylamino)vinylamide; N'-(2-methylamino)vinylamide; urea, N,N'-dimethylurea, and N,N,N',N'-tetramethylurea; methylcarbamate and methyl N,N-diethylcarbamate; ε-caprolactam, N-methyl-ε-caprolactam, N-acetyl-ε-caprolactam, 2-pyrrolidone, N-methyl-2-pyrrolidone, N-acetyl-2-pyrrolidone, 2-piperidone, N-methyl-2-piperidone, 2-quinolone, N-methyl-2-quinoline, 2-indolinone, and N-methyl-2-indolinone; isocyanuric acid and N,N',N''-trimethylisocyanuric acid; as well as their corresponding sulfur-containing compounds. Among them, the most preferred are compounds having alkyl groups bonded to nitrogen.

Examples of the method of preparing a styrenebutadiene copolymer rubber having atomic group(s) introduced thereinto and represented by the above-mentioned formula (I) include (a) a process comprising polymerization of styrene and butadiene in the presence of an alkali metal based catalyst and/or alkaline earth metal based catalyst(s), and addition of the compound A to the polymerization reaction mixture solution; and (b) a process comprising addition-reaction of a styrenebutadiene copolymer with alkali metal(s) and/or alkaline earth metal(s) in a solution of the copolymer dissolved in an appropriate solvent, and addition of the compound A to the solution to further effect the reaction.

Alkali metal based catalysts that can be used in the polymerization and addition reactions as mentioned above include metals themselves such as lithium, rubidium, and cesium; and complexes thereof with hydrocarbon compound(s) or polar compound(s) (e.g., n-butyllithium, 2-naphthyllithium, potassium-tetrahydrofuran complex, and potassium-diethoxyethane complex). Examples of alkaline earth metal based catalysts include catalyst systems comprising as the main component a compound of barium, strontium, calcium, or the like, as disclosed in Japanese Patent Laid-Open Nos. 115,590/1976, 9,090/1977, and 100,146/1982. These metal based catalysts are not particularly limited in so far as they can be used as catalyst(s) for ordinary solution polymerization.

After completion of the reaction, an unsaturated rubbery polymer having compound A units introduced thereinto is recovered from the reaction mixture solution by an ordinary separation method such as addition of a coagulating agent such as methanol, or stripping with steam. In the obtained unsaturated rubber polymer, the compound A is introduced in the form of an atomic group represented by the following formula at a molecular terminal or in a chain of the polymer:

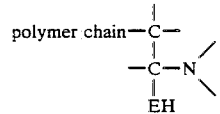

wherein E is O or S.

Although the position of introduction of the compound A may be anywhere at the terminals or other positions of the molecular chain, the terminals of the molecular chain are preferred. The use of a polymer obtained in the reaction of a copolymer having a dienyl structure at the terminals of the molecular chain with the compound A contributes to further reduce fuel consumption.

An indispensable constituent of the present invention is the inclusion of an atomic group represented by the above-mentioned formula (I) in the molecular chain of the styrene-butadiene copolymer rubber. A rubber composition containing this styrene-butadiene copolymer shows a remarkably improved impact resilience as compared with a rubber composition comprising an ordinary styrene-butadiene copolymer rubber having no atomic group represented by the above-mentioned formula (I). Therefore, a pneumatic tire using this rubber composition in the tread can significantly reduce the fuel comsumption while maintaining other properties at high levels.

(2) The styrene-butadiene rubber to be used in the present invention comprises 10 to 30 wt. % of bonded styrene units and 25 to 80 wt. % of 1,2-vinyl bonds in the butadiene units.

When the amount of bonded styrene units is less than 10 wt. %, the wet skid resistance of the rubber composition is reduced, unfavorably weakening the braking power of the tire on a wet road surface. On the other hand, when it exceeds 30 wt. %, the braking power on a snow-covered or frozen road surface as well as the abrasion resistance are disadvantageously deteriorated although the braking power on a wet road surface is increased.

When the amount of 1,2-vinyl bonds is less than 25%, the effect of improving the braking power on a wet road surface is small. On the other hand, when it exceeds 80%, not only heat build-up is increased, but also the braking power on a frozen road surface and the abrasion resistance are disadvantageously decreased largely.

The styrene-butadiene copolymer rubber to be used in the present invention may contain a branched polymer having branches bonded with a tin-butadienyl bond in order to provide a good processability in tire manufacturing. However, when too many molecular terminals of the styrene-butadiene copolymer rubber are utilized for formation of tin-butadienyl bonds, the number of the effective molecular terminals to be utilized for introduction of an atomic group represented by the above-mentioned formula (I) is decreased. Thus, in order to secure the tire performance desired in the present invention while maintaining the good processability in tire manufacturing, it is preferred that the ratio, A/B, of the branched polymer (A) having branches bonded with a tin-butadienyl bond to the polymer (B) having at least one atomic group introduced thereinto and represented by the above-mentioned formula (I), is within a range of 0.1 to 4.0.

(3) Halogenated butyl rubber to be used in the present invention is, for example, chlorinated butyl rubber or brominated butyl rubber.

(4) In the present invention, the rubber composition may contain, as a reinforcing agent, 30 to 80 parts by weight of carbon black based on 100 parts by weight of the raw material rubber.

When the amount of carbon black is less than 30 parts by weight, neither sufficient braking power on a wet road surface nor sufficient abrasion resistance can be secured in the tire. On the other hand, when it exceeds 80 parts by weight, not only is the fuel consumption of the tire increased, but also the tendency to slip on a frozen road surface is unfavorably increased due to an increase in hardness of the tread portion at low temperatures.

The properties required of carbon black to be used herein includes a specific surface area ($N_2SA$) of 60 to 140 $m^2/g$, preferably 75 to 120 $m^2/g$, as measured by the nitrogen adsorption method, and a dibutyl phthalate absorption (DBP absorption) of 100 to 150 ml/100 g, preferably 110 to 140 ml/100 g.

When the $N_2SA$ is less than 60 $m^2/g$, the braking power on a wet road surface and abrasion resistance of the tire are notably deteriorated although the fuel consumption is reduced. On the other hand, when the $N_2SA$ exceeds 140 $m^2/g$, the fuel consumption of the tire is unfavorably increased.

When the DBP absorption is less than 100 ml/100 g, not only the abrasion resistance of the tire is lowered, but also the controllability is disadvantageously deteriorated. When it exceeds 150 m(/100 g, the tread portion of the tire is disadvantageously liable to harden at low temperatures, leading to a decrease in braking power on a snow-covered or frozen road surface.

The rubber composition of the present invention may contain vulcanizing agent(s), vulcanization accelerator(s), vulcanization accelerator activator(s), antioxidant(s), and/or softener(s), all of which are compounding ingredients commonly used in the rubber industry. This rubber composition can be applied to all tires including not only passenger car tires but also truck and bus tires without any particular limitation of the kind of tire.

Examples and Comparative Examples will now be described.

EXAMPLES and COMPARATIVE EXAMPLES (A) The properties of a styrene-butadiene copolymer rubber (SBR) used herein are shown in Table I, while the respective formulations (in parts by weight) of the rubber compositions using the SBR as a component are shown in Table II with the physical properties thereof.

As the blending method, the rubbers and blending agents shown in Table II were mixed with each other during 4 minutes in a 1.7-lBanbury mixer, then sulfur and vulcanizing accelerator(s) were added thereinto and mixed for 4 minutes with a roller. After the vulcanization of the obtained mixture at 160° C. × 15 minutes, Lüpke rebound elasticity, hardness at −10° C. and Pico abrasion were respectively measured. Lüpke rebound elasticity and Pico abrasion were respectively evaluated in terms of an index relative to an index of 100 as defined for Comparative Example 2. With respect to the Lüpke rebound elasticity, the value of elasticity became smaller where the index decreased at 0° C. and 50° C. The wet skid property was improved when the index of Lüpke rebound elasticity at 0° C. was smaller, and the rolling resistance was improved when the index at 50° C. was higher. Pico abrasion was evaluated in terms of an index of abrasion resistance. The higher the index, the better the abrasion resistance. The hardness at −10° C. showed that the smaller the index, the softer the tire tread at a low temperature and the better the braking power on a snow-covered or frozen road surface.

TABLE I

|  | bonded styrene units[*1] (wt. %) | 1,2-vinyl[*2] bonds | modification |
|---|---|---|---|
| SBR (1) | 20 | 60 | modified[*3] |
| SBR (2) | 25 | 50 | modified[*4] |
| SBR (3) | 25 | 50 | not modified |

(Notes):
[*1, *2] measured by H-NMR method.
[*3] used, as compound A, N, N—dimethyl-nicotinamide.
[*4] used, as compound A, N—methyl-2-pyrrolidone.

TABLE II

|  |  | Comparative Example | | Example | | | | | Comparative Example | |
|---|---|---|---|---|---|---|---|---|---|---|
| No. |  | 1 | 2 | 3 | 4 | 4 | 6 | 7 | 8 | 9 |
| NR (TTR-20) |  | 40 | 50 | 30 | 40 | 35 | 45 | 45 | 45 | 40 |
| SBR (1) |  | 60 | 50 | 60 | 50 | 60 | 50 |  |  |  |
| SBR (2) |  |  |  |  |  |  |  | 50 |  |  |
| SBR (3) |  |  |  |  |  |  |  |  | 50 | 50 |
| Cl—IIR (1) |  |  |  | 10 | 10 | 5 | 5 | 5 | 5 | 10 |
| ZnO |  | 3.00 | 3.00 | 3.00 | 3.00 | 3.00 | 3.00 | 3.00 | 3.00 | 3.00 |

TABLE II-continued

|  | Comparative Example | | Example | | | | | Comparative Example | |
| --- | --- | --- | --- | --- | --- | --- | --- | --- | --- |
| No. | 1 | 2 | 3 | 4 | 4 | 6 | 7 | 8 | 9 |
| stearic acid | 1.50 | 1.50 | 1.50 | 1.50 | 1.50 | 1.50 | 1.50 | 1.50 | 1.50 |
| aromatic oil | 5.00 | 5.00 | 5.00 | 5.00 | 5.00 | 5.00 | 5.00 | 5.00 | 5.00 |
| N339 carbon (2) | 50 | 50 | 50 | 50 | 50 | 50 | 50 | 50 | 50 |
| sulfur | 1.75 | 1.75 | 1.75 | 1.75 | 1.75 | 1.75 | 1.75 | 1.75 | 1.75 |
| vulcanization accelerator (3) | 1.00 | 1.00 | 1.00 | 1.00 | 1.00 | 1.00 | 1.00 | 1.00 | 1.00 |
| Lupke rebound elasticity (4) | | | | | | | | | |
| 0° C. | 95 | 100 | 73 | 82 | 86 | 86 | 90 | 95 | 82 |
| 50° C. | 97 | 100 | 95 | 98 | 100 | 98 | 98 | 90 | 86 |
| hardness (−10° C.) (5) | 69 | 70 | 70 | 70 | 70 | 70 | 70 | 71 | 72 |
| Pico abrasion (6) | 97 | 100 | 95 | 96 | 98 | 98 | 97 | 95 | 93 |

(Notes):
(1) chlorobutyl-1066 (ESSO CHEMICAL).
(2) Seast KH (Tokai Carbon Co., Ltd.),
(3) N—cyclohexyl-2-benzothiazyl-sulfenamide.
(4), (5) measured by JIS K 6301.
(6) measured by ASTM D-2228.

As shown in Table II above, Nos. 1–2 and Nos. 8–9 are Comparative Examples, and Nos. 3–7 are Examples. Examples 3 and α are respectively obtained by replacing 10 pHR of natural rubber (NR) of Comparative Examples 1 and 2 with 10 pHR of chlorinated butyl rubber (Cl-IIR) and, by same manner, Examples 5 and 6 are obtained with 5 pHR of Cl-IIR. In any Examples compared to Comparative Examples 1 and 2, Lüpke rebound elasticity at 50° C., hardness and Pico abrasion are almost not changed although Lüpke rebound elasticity at 0° C. is deteriorated. This fact, namely, shows that the addition of C(-IIR improved remarkably the wet skid property without decreasing the rolling resistance. In the rubber composition of the present invention, the properties on a snow-covered road surface are recognized to be better where the hardness at −10° C. is 72 or less.

Comparative Examples 8 and 9 wherein Cl-IIR is respectively added to the SBR (3) not modified are smaller in Lüpke rebound elasticity at 50° C. in comparison with Example 7 having almost same microstructure of SBR as in the Comparative Examples 8 and 9. This fact shows that, by using the SBR (2) modified, the rubber composition excellent in both of the rolling resistance and the wet skid property can be obtained.

(B) Rubber compositions of the present invention were used in a tire tread to produce 12 kinds of tires 165 SR 13. Each tire was evaluated in a wet road braking test, a frozen road braking test, and a rolling resistance test by using a stock car according to the following methods. The results are also shown in Table III below.

(1) Wet road braking test

Water was sprinkled over the surface of an asphalt pavement. The brake distance was measured when the brake was applied at a speed of 40 km/hr. Evaluation was made in terms of an index relative to an index of 100 as defined for the tire of Comparative Example 11. The higher the index, the better the braking performance.

(2) Frozen road braking test

The distance from brake application to complete stop of the car was measured when the brake was applied in the course of running on a road surface perfectly frozen at an air temperature of −5° to −10° C. at a speed of 40 km/hr. Evaluation was made in terms of an index relative to an index of 100 as defined for the tire of Comparative Example 11. The higher the index, the better the braking performance.

(3) Rolling resistance test

Preliminary running was carried out on an indoor test drum of 707 mm in diameter with an internal tire pressure of 1.9 kg/cm² under a load of 420 kg at a speed of 100 km/hr for 30 min. Thereafter, the rolling resistance was measured at a speed of 60 km/hr. Evaluation was made in terms of an index relative to an index of 100 as defined for the tire of Comparative Example 11. The lower the index, the lower the rolling resistance and hence the smaller the fuel consumption.

TABLE III

|  | Comparative Example | | | | Example | | | | | Comparative Example | | |
| --- | --- | --- | --- | --- | --- | --- | --- | --- | --- | --- | --- | --- |
|  | 10 | 11 | 12 | 13 | 14 | 15 | 16 | 17 | 18 | 19 | 20 | 21 |
| NR (TTR-20) | 40 | 50 | 20 | 18 | 30 | 40 | 55 | 45 | 45 | 75 | 45 | 40 |
| SBR (1) | 60 | 50 | 60 | 80 | 60 | 50 | 33 | 50 |  | 20 |  |  |
| SBR (2) |  |  |  |  |  |  |  |  | 50 |  |  |  |
| SBR (3) |  |  |  |  |  |  |  |  |  |  | 50 | 50 |
| Cl—IIR (1) |  |  | 20 | 2 | 10 | 10 | 12 | 5 | 5 | 5 | 5 | 10 |
| ZnO | 3.00 | 3.00 | 3.00 | 3.00 | 3.00 | 3.00 | 3.00 | 3.00 | 3.00 | 3.00 | 3.00 | 3.00 |
| stearic acid | 1.50 | 1.50 | 1.50 | 1.50 | 1.50 | 1.50 | 1.50 | 1.50 | 1.50 | 1.50 | 1.50 | 1.50 |
| aromatic oil | 5.00 | 5.00 | 5.00 | 5.00 | 5.00 | 5.00 | 5.00 | 5.00 | 5.00 | 5.00 | 5.00 | 5.00 |
| N339 (2) | 50 | 50 | 50 | 50 | 50 | 50 | 50 | 50 | 50 | 50 | 50 | 50 |
| sulfur | 1.75 | 1.75 | 1.75 | 1.75 | 1.75 | 1.75 | 1.75 | 1.75 | 1.75 | 1.75 | 1.75 | 1.75 |
| vulcanization accelerator (3) | 1.00 | 1.00 | 1.00 | 1.00 | 1.00 | 1.00 | 1.00 | 1.00 | 1.00 | 1.00 | 1.00 | 1.00 |
| tire performance | | | | | | | | | | | | |
| wet road braking test | 103 | 100 | 138 | 130 | 123 | 117 | 115 | 113 | 110 | 90 | 105 | 120 |
| frozen road braking test | 102 | 100 | 90 | 90 | 101 | 100 | 102 | 100 | 99 | 100 | 98 | 95 |

TABLE III-continued

| | Comparative Example | | | | Example | | | | | Comparative Example | | |
|---|---|---|---|---|---|---|---|---|---|---|---|---|
| | 10 | 11 | 12 | 13 | 14 | 15 | 16 | 17 | 18 | 19 | 20 | 21 |
| rolling resistance test | 102 | 100 | 135 | 130 | 105 | 103 | 105 | 99 | 102 | 98 | 111 | 115 |

(Notes):
(1), (2), (3) Same as in Table II

It will be apparent from Table III above that the compositions of Examples 14–18 containing 25–55 parts by weight of natural rubber, 30–70 parts by weight of a specific SBR, and 5–15 parts by weight of chlorinated butyl rubber improve the braking power on a wet road surface while maintaining the frozen road braking power and the rolling resistance in good conditions. Compared to the blended system (Comparative Examples 10 and 11) wherein natural rubber and a specific SBR are mixed, the system (Examples 14 and 15) with the addition of 10 parts by weight of chlorinated butyl rubber improves the braking power on a wet road surface at the rate of about 20 percent while maintaining the frozen road braking power and the rolling resistance in good conditions. This tendency is same to the composition (Examples 17 and 18) having 5 parts by weight of chlorinated butyl rubber, and to the composition (Example 16) having 12 parts by weight of chlorinated butyl rubber. However, the composition (Comparative Example 12) having 20 parts by weight of chlorinated butyl rubber deteriorates largely the frozen road braking power to break down the balance of the three properties although the braking power on a wet road surface is improved. This tendency is same to the composition (Comparative Example 13) wherein the content of a specific SBR is increased up to 80 parts by weight. The composition (Comparative Example 19) wherein the content of a specific SBR is decreased to 20 parts by weight can maintain only the frozen road braking power in good conditions with the remarkable decrease of the braking power on a wet road surface.

As described above, according to the present invention, there can be obtained a rubber composition suitable for the tread of an all-season pneumatic tire having a remarkably lowered fuel consumption and simultaneously satisfying the braking power on a wet road surface and that on a snow-covered or frozen road surface.

We claim:
1. A rubber composition for a tire tread comprising:
   (a) 25 to 55 parts by weight of a rubber selected from the group consisting of natural rubber and polyisoprene rubber;
   (b) 5 to 15 parts by weight of a halogenated butyl rubber;
   (c) 70 to 30 parts by weight of a styrenebutadiene copolymer rubber including 10 to 30 wt. % of bonded styrene units and 25 to 80% of 1,2-vinyl bonds in the butadiene units and having at a molecular terminal or in a chain thereof an atomic group introduced thereinto and represented by formula (I):

wherein E is O or S; and
   (d) 30 to 80 parts by weight, based on 100 parts by weight of the raw rubber, of carbon black.

2. A rubber composition for a tire tread as claimed in claim 1, wherein 30 parts by weight of a rubber selected from the group consisting of polybutadiene rubber, acrylonitrile-butadiene copolymer rubber, and non-modified styrene-butadiene copolymer rubber is further incorporated, with the proviso that total rubber contents are in an amount of 100 part by weight.

3. A rubber composition for a tire tread as claimed in claim 1, wherein said styrene-butadiene copolymer rubber contains a branched polymer having branches bonded with a tin-butadienyl bond, the ratio of said branched polymer having branches bonded with a tin-butadienyl bond to said styrene-butadiene copolymer rubber without a tin-butadienyl bond being in the range of 0.1 to 4.0.

4. A rubber composition for a tire tread as claimed in claim 1, wherein said halogenated butyl rubber is selected from the group consisting of chlorinated butyl rubber and brominated butyl rubber.

5. The rubber composition as claimed in claim 1, wherein said carbon black has a specific surface area ($N_2SA$) of 60 to 140 $m^2/g$ as measured by the nitrogen adsorption method and a dibutyl phtalate absorption (DBP absorption) of 100 to 150 ml/100 g.

* * * * *